(12) United States Patent
Mokrzycki et al.

(10) Patent No.: US 6,386,550 B1
(45) Date of Patent: May 14, 2002

(54) SUBTERRANEAN COUPLER

(75) Inventors: John Mokrzycki, Barrie; Michael Greer, Mississauga, both of (CA)

(73) Assignee: Stepcon Industries Inc., Mississauga (CA)

( * ) Notice: Subject to any disclaimer, the term of this patent is extended or adjusted under 35 U.S.C. 154(b) by 0 days.

(21) Appl. No.: 09/496,584

(22) Filed: Feb. 2, 2000

(51) Int. Cl.[7] .......................... F16L 17/00; F16L 21/02; F16L 3/00; E02D 29/14; E02B 13/00
(52) U.S. Cl. .................. 277/616; 277/625; 277/917; 52/21; 405/47; 285/140.1
(58) Field of Search ................................. 277/606, 607, 277/608, 609, 615, 616, 626, 625, 917; 52/21, 169.6, 220.8, 676; 405/43, 46, 47; 285/140.1, 210

(56) References Cited

U.S. PATENT DOCUMENTS

| | | | |
|---|---|---|---|
| 3,543,457 A | * | 12/1970 | Budlong |
| 3,731,448 A | * | 5/1973 | Leo |
| 4,342,462 A | * | 8/1982 | Carlesimo |
| 4,663,036 A | * | 5/1987 | Strobl, Jr. et al. |
| 4,732,397 A | | 3/1988 | Gavin |
| 4,805,920 A | | 2/1989 | Gavin |
| 4,817,348 A | * | 4/1989 | Wydra |
| 4,951,914 A | | 8/1990 | Meyers et al. |
| 5,029,879 A | * | 7/1991 | Strang, Sr. et al. |
| 5,286,040 A | | 2/1994 | Gavin |
| 5,601,291 A | | 2/1997 | Gavin |
| 5,624,123 A | | 4/1997 | Meyers |
| 5,626,346 A | | 5/1997 | Gavin |
| 5,711,536 A | | 1/1998 | Meyers |
| 5,941,535 A | * | 8/1999 | Richard |
| 5,954,345 A | * | 9/1999 | Svoboda et al. |

OTHER PUBLICATIONS

Tuf–Tite Corporation's Advertisement appearing in MC Magazine, Spring 1999 edition, p.49*.
United Concrete Products Inc.'s Advertisement appearing in MC Magazine, Spring 1999 edition, p.74*.

* cited by examiner

Primary Examiner—Anthony Knight
Assistant Examiner—Vishal Patel
(74) Attorney, Agent, or Firm—Ridout & Maybee LLP; Dolly Kao; David Greer

(57) ABSTRACT

A subterranean coupler for slidably receiving a pipe therethrough and for coupling the pipe to a subterranean vessel. The coupler is mountable to a reinforcing grid prior to the coupler and reinforcing grid being cast in a concrete wall of the subterranean vessel. The coupler includes a longitudinally-extending axis and a cylindrical wall defined about the axis, the wall having an inner surface, an outer surface, and first and second ends. The coupler further includes a plurality of radially-extending, circumferentially-spaced engagement members integrally-formed with the outer surface. The engagement members are engageable with grid members of the reinforcing grid to mount the cylindrical wall to the reinforcing grid prior to casting. The coupler further includes pipe receiving means associated with the inner surface for slidably receiving the pipe therethrough and securing the pipe to the coupler, whereby the coupler may be releasably mounted to a reinforcing grid using the engagement members and then cast into a concrete wall of a subterranean vessel with the opposed first and second ends being exposed on respective opposite sides of the concrete wall, and a pipe may be slidably inserted through one of the ends into the pipe receiving means and thereby coupled to the subterranean vessel.

18 Claims, 2 Drawing Sheets

SUBTERRANEAN COUPLER

BACKGROUND OF THE INVENTION

The present invention relates to couplers for casting in a concrete wall of a subterranean vessel, the coupler being for slidably receiving a pipe therethrough and for coupling the pipe to the subterranean vessel.

It is common to cast couplers or pipe seal assemblies in concrete walls of subterranean vessels, such as catch basins of drainage systems, to provide a means for sealingly connecting discharge pipes to the subterranean vessels. A known method of casting involves mounting a coupler to a mandrel which is screwed or bolted to one of a pair of form walls used in casting a concrete wall. A metal reinforcing grid is then positioned between the form walls with the coupler and mandrel assembly extending through an opening through the grid. Newly mixed concrete is then poured into the form. While this is done, the mandrel supports the coupler to protect it against distortion or collapse under the heavy weight of the poured concrete. After the concrete solidifies, the form walls and attached mandrel are separated from the newly formed concrete wall with the coupler and grid embedded therein. The grid imparts strength to the concrete wall and the coupler permits a drainage pipe to be connected to the wall which is usually formed as part of a subterranean vessel. Known couplers or pipe seals which require the use of mandrels to be cast in concrete walls are disclosed in, for example, U.S. Pat. Nos. 4,951,914, 5,624,123, 5,711,536, 4,732,397 and 4,805,920.

A disadvantage associated with the use of a mandrel in casting a coupler in a concrete wall is that the mandrel location on the form wall dictates the location of the coupler in the concrete wall to be formed. If such location not desired, the mandrel must be unbolted and reattached to the form wall at a different location. The act of removing and reattaching the mandrel is time consuming and reduces the life of the form wall.

It is known to construct drainage systems using catch basins situated in various locations and having walls in which are embedded more couplers than are required for the particular application. This is to provide flexibility in structuring the drainage system to suit the needs of the particular application. The couplers used in such systems commonly include knock-out seal membranes which prevent liquid from flowing through the couplers when the couplers are not to be used. If the couplers are to be used, the seal membranes may be removed in whole or in part to provide openings through which similarly dimensioned pipes may be inserted. Thereafter, openings in the catch basin exist at the location of the couplers which have been thus modified. In some situations, such as when an underground drainage system is to be restructured to accommodate changing demands, there is a need to close previously formed openings in a catch basin.

It is therefore desirable to provide an improved coupler which can address the above needs and overcome the above disadvantages of prior couplers.

SUMMARY OF THE INVENTION

According to one aspect of the present Invention, there is provided a coupler for casting in a concrete wall of a subterranean vessel, the wall having a reinforcing grid, the coupler for coupling a pipe through an opening in the concrete wall and comprising a cylindrical wall having first and second ends, an inner surface, and an outer surface; and a plurality of circumferentially-spaced engagement members extending radially from the outer surface for engaging grid members of the reinforcing grid to mount the cylindrical wall to the reinforcing grid.

The coupler may include a circular transversely-extending seal membrane integrally formed with the inner surface across a longitudinally-extending passage of the cylindrical wall, the seal membrane having a circular portion which is removable to provide an aperture for slidably receiving a pipe therethrough.

The coupler may further include a removable support plug insertable into at least one of the ends, and being engageable with the inner surface of the cylindrical wall to provide radial support for the cylindrical wall during casting. The support plug may be adapted for use in sealing a longitudinally-extending passage of the cylindrical wall after the circular portion is removed, if desired.

The seal membrane may have a cylindrical flange integrally formed therewith about the circular portion to sealingly engage a pipe inserted through the cylindrical flange after removal of the circular portion.

According to a further aspect of the invention, there is provided a coupler for slidably receiving a pipe therethrough and for coupling the pipe to a subterranean vessel, the coupler being mountable to a reinforcing grid prior to the coupler and reinforcing grid being cast in a concrete wall of the subterranean vessel. The coupler comprises a cylindrical wall having a first end, a second end, an outer surface and an inner surface defining a passageway extending between the first and second ends for receiving the pipe. An end cap is releasably engaged to one of the first and second ends and has a sealing wall that is disposed across the passageway. A seal membrane is integrally formed with the inner surface and extends across the passageway, at least a portion of the seal membrane being breachable to facilitate insertion of a pipe through the passageway. The coupler may be cast into a concrete wall of a subterranean vessel with the first and second ends being exposed on respective opposite sides of the concrete wall.

BRIEF DESCRIPTION OF THE DRAWINGS

To assist in better understanding the invention, a preferred embodiment will now be described with reference to the drawings in which.

DESCRIPTION OF THE PREFERRED EMBODIMENTS

Figure 1:
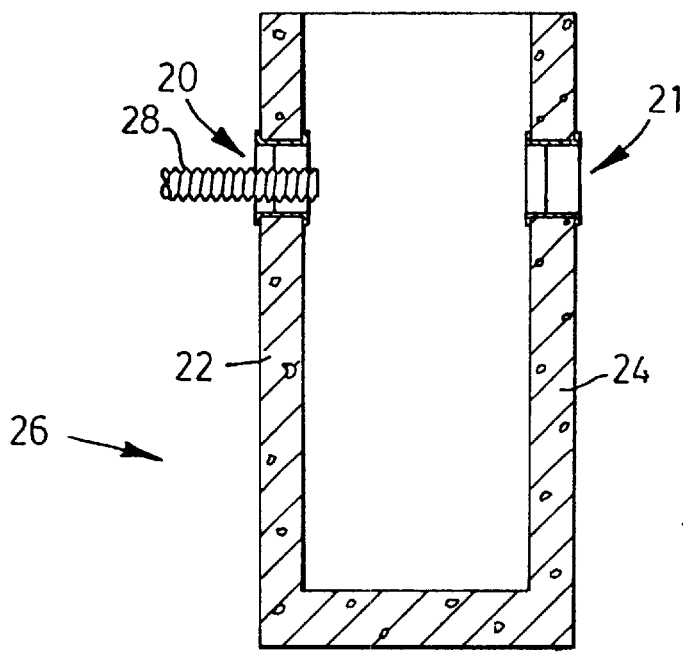
FIG. 1 is a sectional view of a pair of subterranean couplers according to the preferred embodiment of the present invention installed in respective opposing walls of a concrete catch basin.

Referring to FIG. 1, two similar subterranean couplers designated generally by reference numbers 20, 21 are shown cast in a similar fashion in respective opposed concrete walls 22, 24 of a subterranean vessel in the form of a concrete catch basin indicated generally at 26. The couplers 20, 21 each can slidably receive a pipe therethrough to couple the pipes to the catch basin 26, as will be described further below. In the present example, coupler 20 is used to connect a corrugated drainage pipe 28 to the catch basin 26 which forms a part of a conventional underground drainage system.

Figure 2:
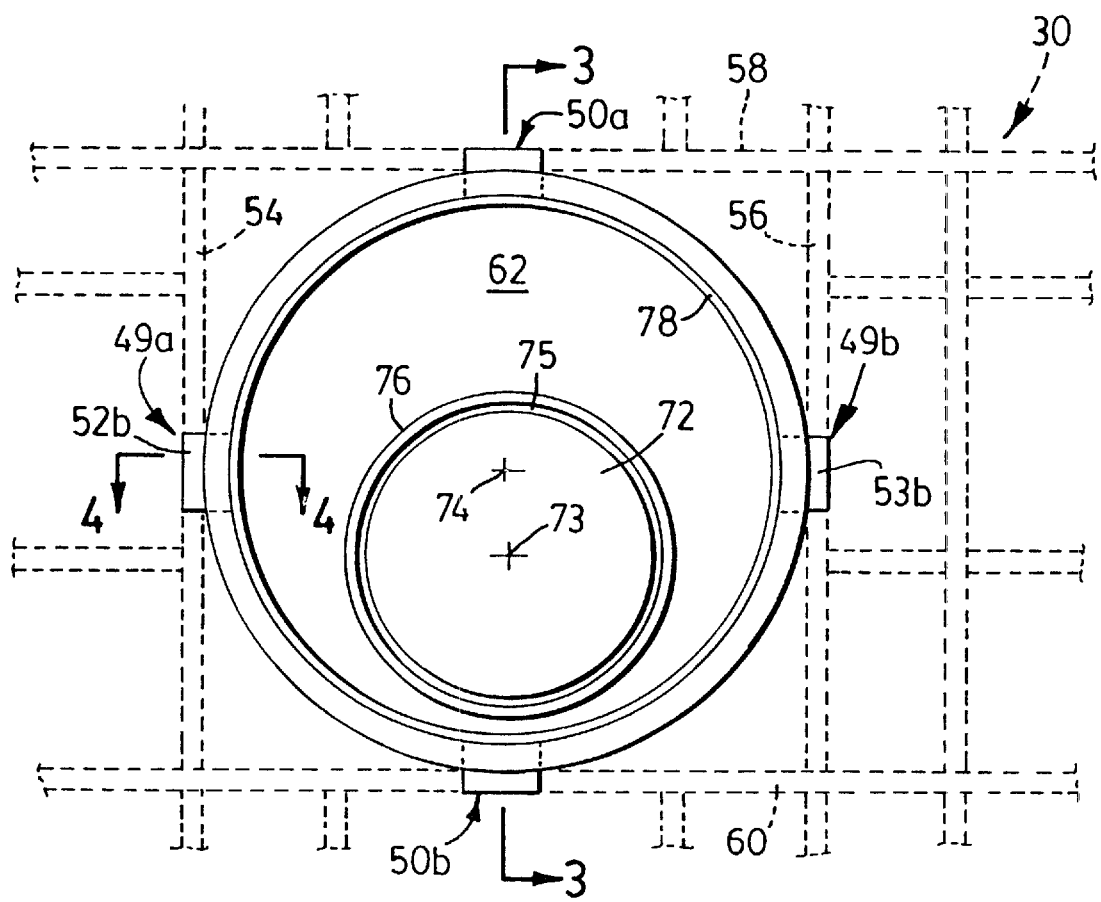
FIG. 2 is a partial front view of one of the walls showing one of the subterranean couplers cast therein.
Figure 3:
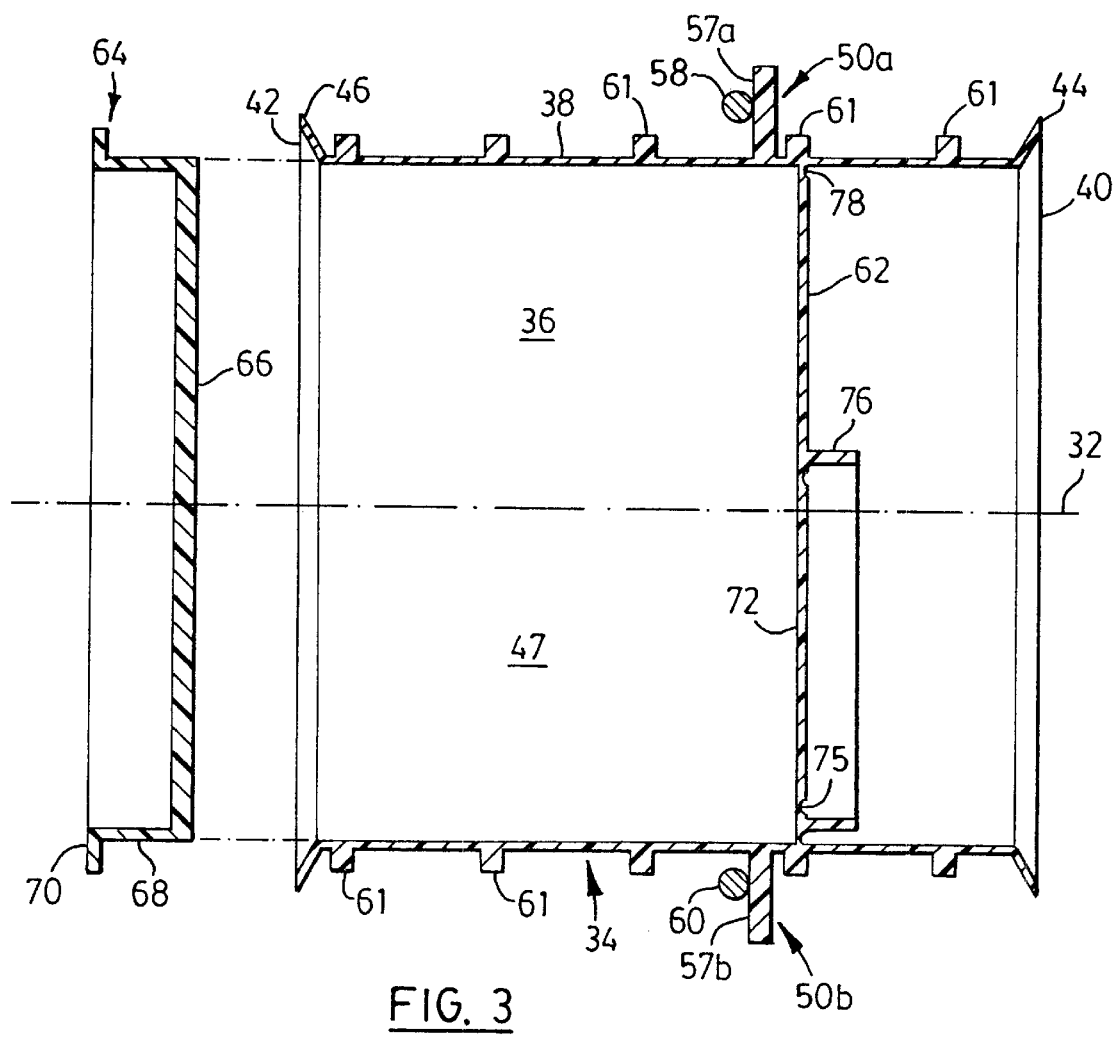
FIG. 3 is a sectional view of the coupler taken along line 3—3 of FIG. 2.

The coupler 21 and formation of concrete wall 24 will now be described and it should be understood that the following description applies similarly to the coupler 20 and concrete wall 22. As can be seen in FIGS. 2 and 3, the coupler 21 has an injection-molded body made of polyethylene chloride and includes a cylindrical wall 34 that defined about a longitudinally-extending axis 32. The cylindrical wall 34 has an inner surface 36, an outer surface 38, and first and second ends 40, 42 provided with respective outwardly opening frusto-conical annular lips 44, 46. A longitudinal passageway 47 extends through the cylindrical wall 34 between the ends 40, 42. As shown in FIG. 3, a transversely-extending seal membrane 62, to be described further below, is formed across the passageway 47 to seal it off.

The coupler 21 is mounted in an enlarged opening in a metal reinforcing grid 30, prior to casting, using a plurality of radially-extending, circumferentially spaced engagement members integrally formed with the outer surface 38 of the cylindrical wall 34. The grid 30 lends strength to the finished wall 24 and the enlarged opening is formed by breaking away portions of grid members in the form of bars as shown in FIG. 2.

Figure 4:
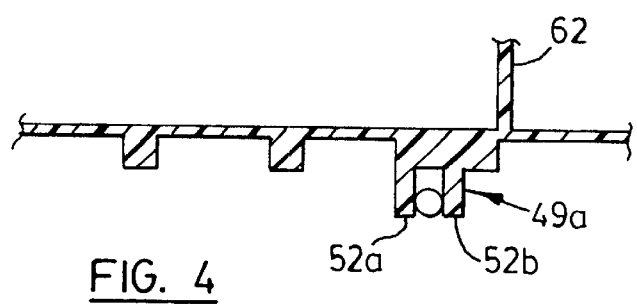
FIG. 4 is a sectional view of the coupler taken along line 4—4 of FIG. 2.

Referring to FIGS. 2 to 4, the engagement members consist of a pair of diametrically opposed U-shaped members 49a, 49b, and a pair of diametrically-opposed tabs 50a, 50b. The U-shaped members 49a, 49b have opposed fingers of which fingers 52a, 52b of U-shaped member 49a are shown in FIG. 4 and finger 53b of U-shaped member 49b is shown in FIG. 2. These fingers are for engaging bars 54, 56 of the reinforcing grid therebetween in a tight fit. The tabs 50a, 50b have respective radially-extending surfaces 57a, 57b for engaging bars 58, 60 of the grid 30 as best seen in FIG. 3.

With continued reference to FIG. 3, radial support against compression during casting of the vessel wall is provided by a number of means. First, the cylindrical wall 34 includes a plurality of annular reinforcing ribs 61 integrally formed with the outer surface 38 and spaced along the length of the cylindrical wall 34. Second, the coupler 21 includes a transversely-extending seal membrane 62 integrally formed with the inner surface 36 across the longitudinally-extending passage 47. The seal membrane 62 also functions as a pipe receiving means in this embodiment for slidably receiving a pipe therethrough and for securing the pipe to the coupler 21, as will be described further below. Finally, the coupler 21 includes a removable support plug in the form of an end cap 64 which is insertable in the cylindrical wall 34 through the second end 42. The end cap 64 has a circular sealing wall 66 disposable transversely across the longitudinal passage 47 to seal the passage 47. Furthermore, the end cap 64 includes a cylindrical member 68 having an outer surface engageable with the inner surface 36 of the cylindrical wall 34. One end of the cylindrical member 68 is integrally formed with a peripheral portion of the sealing wall 66, the other end is integrally connected to a radially-extending annular flange 70 engageable with the second end 42 of the cylindrical wall 34 when the end cap 64 is inserted through that end 42. The seal membrane 62 is disposed intermediate the first and second ends 40, 42 and closer to the first end 40 to provide radial support near that end. The end cap 64 is insertable through the second end 42 to provide radial support near the second end during casting. Thus, there is no need to mount the coupler 21 on a mandrel during casting as the above-mentioned features of the coupler 21 provide adequate support against radial compression or distortion.

Once cast in the concrete wall 24, the end cap 64 is removed and, if desired, a pipe may be connected to the catch basin 26 using the coupler 21 as follows. A circular portion 72 of the seal membrane 62, having a center 73 spaced from a center 74 of the seal membrane, may be removed to provide a 4.5 inch diameter of a first size (say for example, 4.5 inches) aperture through which a similarly dimensioned pipe may be inserted. Surrounding the circular portion 72 is a weakened narrow annular portion 75 which facilitates removal of the circular portion 72. A longitudinally-extending cylindrical flange 76 is integrally-formed with the seal membrane 62 about the weakened annular portion 75. The length of the cylindrical flange 76 is such that it can span the rise and land of a corrugated expandable pipe inserted through the extension 76 to provide an improved seal between the pipe and the seal membrane 62 and minimize leakage. In one exemplary embodiment, flange 76 extends ⅝" from the front of the member 62.

A pipe having a diameter larger than the circular portion (say for example 7 inches in one exemplary embodiment) can be connected to the catch basin 26 by breaking away the seal membrane 62 entirely. This is facilitated by a second weakened annular portion 78 disposed along a juncture between the cylindrical wall 34 and the seal membrane 62. Thus, two sizes of pipes may alternatively be connected to the catch basin using the coupler 21. The end cap 64 and cylindrical wall 34, are preferably dimensioned so that the end cap 64 can be inserted into the first end 40 of the cylindrical wall 34 as well as its second end 42. This permits the end cap 64 to be used to re-seal a coupler in which the seal membrane has been previously breached either through prior use or by accident. In particular, the end cap can be secured to the second end 42 through frictional engagement, and further secured in place by the pressure of backfill placed against the outer surface of the wall to which the coupler is mounted.

The coupler 21 described above has many advantageous features. One advantage is that the coupler 21 may be cast in a concrete wall without having to use a mandrel. The locating function of the mandrel is served by the engagement members (i.e. U-shaped members 49a, 49b, and tabs 50a, 50b) which permit the coupler to be mounted to a reinforcing grid in any one of a number of possible locations. The support function of the mandrel is served in the present invention by reinforcing ribs 61, end cap 64, and seal membrane 62. These features prevent compression of the coupler under the weight of concrete poured over it during casting. It will be appreciated that the presence of all of these features in combinations is not essential to the present invention. For example, in some embodiments, the coupler may not require a transversely-extending seal membrane.

Another advantage is that the engagement members function to space the cylindrical wall 34 from the adjacent bars of the reinforcing grid 30. This permits poured concrete to encase most if not all of the reinforcing grid bars during casting thereby protecting the bars from future rust.

Furthermore, the annular flared lips 44, 46 disposed at the ends 40, 42 of the cylindrical wall help to direct poured concrete away from the ends 40, 42 and minimize the risk of concrete entering the longitudinally-extending passage 47 which would interfere with the operation of the coupler 21. Additionally, the lips 44, 46 help to ensure that a seal is formed between the concrete wall and the coupler. In particular, the coupler is preferably arranged such that the distance between the ends 40, 42 of the cylindrical wall 34 is generally equal to the thickness of the side wall in which the coupler will be mounted, and the flared lips 44, 46 extend outward from these ends such that the total length of the coupler is greater than that of the side wall. During casting, the flared lips 44, 46 are compressed by the form walls, thereby providing a seal between the side wall and the coupler. As mentioned above, the cylindrical extension 76 which is dimensioned to span the rise and land of a corrugated pipe inserted therethrough renders the coupler 21 leak resistant.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A coupler for casting in a concrete wall of a subterranean vessel, the wall having a reinforcing grid, the coupler being for receiving a pipe therethrough and comprising:
    a cylindrical wall having first and second ends, an outer surface and an inner surface defining a passageway extending between said first and second ends for receiving the pipe;
    a plurality of circumferentially-spaced engagement members extending radially from said outer surface and being releasably engageable with grid members of the reinforcing grid to mount the cylindrical wall to the reinforcing grid prior to casting; and
    a seal membrane integrally formed across said cylindrical wall between said first and second ends thereby sealing the passageway, the seal membrane having a circular portion which is removable to provide an aperture for slidably receiving a pipe therethrough.

2. A coupler according to claim 1 comprising a cylindrical flange extending from said seal membrane about said circular portion to sealingly engage a pipe inserted through said cylindrical flange after removal of said circular portion.

3. A coupler according to claim 2 wherein said cylindrical flange is dimensioned to span a rise and land of a corrugated pipe inserted through said cylindrical flange.

4. A coupler according to claim 2 wherein said seal membrane includes a weakened narrow annular portion between said cylindrical flange and said circular portion to facilitate removal of said circular portion.

5. A coupler according to claim 1 wherein said seal membrane includes a weakened narrow annular portion along a juncture between said cylindrical wall and said seal membrane to facilitate removal of said seal membrane.

6. A coupler according to claim 1 further comprising an end cap releasably engageable with one of said first and second ends and having a sealing wall disposable across the passageway between said first and second ends, the end cap comprising a cylindrical member with an outer surface for frictionally engaging the inner surface of the cylindrical wall, the sealing wall being integrally formed across an inner surface of the cylindrical member, whereby the coupler, with the end cap releasably engaged therein, may be cast into the concrete wall with said first and second ends being exposed on respective opposite sides of the concrete wall.

7. A coupler according to claim 6 wherein said seal membrane includes a circular portion removable to provide an aperture through which the pipe can be inserted.

8. A coupler according to claim 6 including a cylindrical flange extending from said seal membrane about said circular portion to sealingly engage the pipe inserted through said cylindrical flange after removal of said circular portion.

9. A coupler for casting in a concrete wall of a subterranean vessel, the wall having a reinforcing grid, the coupler being for receiving a pipe therethrough and comprising:
    a cylindrical wall having first and second ends, an outer surface and an inner surface defining a passageway extending between said first and second ends for receiving the pipe;
    a plurality of circumferentially-spaced engagement members extending radially from said outer surface and being releasably engageable with grid members of the reinforcing grid to mount the cylindrical wall prior to casting; and
    a removable support plug releasably engageable with said inner surface to provide radial support for said cylindrical wall during casting of the concrete wall.

10. A coupler according to claim 9 wherein said support plug comprises a sealing wall disposable transversely across the passageway of said cylindrical wall between said first and second ends.

11. A coupler according to claim 10 wherein said support plug is an end cap insertable into an end of the cylindrical wall, said end cap having a cylindrical member with an outer surface for frictionally engaging the inner surface of the cylindrical wall, the sealing wall being integrally formed across an inner surface of the cylindrical member.

12. A coupler according to claim 11 wherein the end cap includes a radially-extending annular flange integrally-formed around one end of said cylindrical member for engaging an end of the cylindrical wall.

13. A coupler according to claim 11 wherein said seal membrane is disposed intermediate said first and second ends and closer to said first end, and said end cap is insertable through either of said first and second ends, whereby the end cap may provide support during casting of the concrete wall when inserted through said second end, and the end cap may function to seal off the passageway of the cylindrical wall when inserted through either of said first and second ends after casting.

14. A coupler for casting in a concrete wall of a subterranean vessel, the wall having a reinforcing grid, the coupler being for receiving a pipe therethrough and comprising:
    a cylindrical wall having first and second ends, an outer surface and an inner surface defining a passageway extending between said first and second ends for receiving the pipe; and
    a plurality of circumferentially-spaced engagement members extending radially from said outer surface and being releasably engageable with grid members of the reinforcing grid to mount the cylindrical wall prior to casting;
    wherein at least some of said engagement members comprise U-shaped members each having opposed fingers for engaging a grid member of the reinforcing grid therebetween.

15. A coupler for casting in a concrete wall of a subterranean vessel, the wall having a reinforcing grid, the coupler being for receiving a pipe therethrough and comprising:
    a cylindrical wall having first and second ends, an outer surface and an inner surface defining a passageway extending between said first and second ends for receiving the pipe; and
    a plurality of circumferentially-spaced engagement members extending radially from said outer surface and being releasably engageable with grid members of the reinforcing grid to mount the cylindrical wall prior to casting;
    wherein at least some of said engagement members comprise tabs each having a radially-extending surface engageable with a grid member of the reinforcing grid.

16. A coupler for casting in a concrete wall of a subterranean vessel, the wall having a reinforcing grid, the coupler being for receiving a pipe therethrough and comprising:

a cylindrical wall having first and second ends, an outer surface and an inner surface defining a passageway extending between said first and second ends for receiving a pipe;

a plurality of circumferentially-spaced engagement members extending radially from said outer surface and being releasably engageable with grid members of the reinforcing grid to mount the cylindrical wall prior to casting; and an outwardly opening frusto-conical annular lip provided on each of said first and second ends.

17. A coupler for casting in a concrete wall of a subterranean vessel, the wall having a reinforcing grid, the coupler being for receiving a pipe therethrough and comprising:

a cylindrical wall having first and second ends, an outer surface and an inner surface defining a passageway extending between said first and second ends for receiving the pipe;

a plurality of circumferentially-spaced engagement members extending radially from said outer surface and being releasably engageable with grid members of the reinforcing grid to mount the cylindrical wall prior to casting; and a plurality of spaced annular reinforcing ribs integrally formed with said outer surface to give added strength to the coupler during casting.

18. A subterranean vessel comprising:

a concrete wall having formed therein a reinforcing grid with a plurality of grid members, an opening being provided through the concrete wall; and a coupler located through the opening for coupling a pipe to the subterranean vessel, the coupler including, (a) a cylindrical wall having first and second ends, an outer wall and an inner wall defining a passageway extending between said first and second ends for receiving the pipe therethrough;

(b) a plurality of radially-extending, circumferentially-spaced engagement members integrally-formed with said outer surface, said engagement members being engaged with grid members of the reinforcing grid to mount the cylindrical wall to the reinforcing grid prior to casting; and (c) a transversely-extending seal membrane integrally formed with said inner surface across the passageway, the seal membrane having a circular portion removable to provide an aperture through which the pipe can be inserted.

* * * * *